April 21, 1970 W. P. LEAR 3,507,501

SELECTIVE-STEREO/MONAURAL TAPE CARTRIDGE PLAYER

Filed Jan. 24, 1966 7 Sheets-Sheet 1

INVENTOR,
WILLIAM P. LEAR
BY Richard A. Marsen
his ATTORNEY

INVENTOR,
WILLIAM P. LEAR
BY
Richard A. Marsen
his ATTORNEY.

SELECTIVE-STEREO/MONAURAL TAPE CARTRIDGE PLAYER

Filed Jan. 24, 1966 7 Sheets-Sheet 3

INVENTOR,
WILLIAM P. LEAR
BY Richard A. Marsa
his ATTORNEY.

April 21, 1970 W. P. LEAR 3,507,501

SELECTIVE-STEREO/MONAURAL TAPE CARTRIDGE PLAYER

Filed Jan. 24, 1966 7 Sheets-Sheet 4

INVENTOR,
WILLIAM P. LEAR

BY Richard A. Marsen
his ATTORNEY

INVENTOR,
WILLIAM P. LEAR

BY Richard A. Marsen
his ATTORNEY.

April 21, 1970 W. P. LEAR 3,507,501

SELECTIVE-STEREO/MONAURAL TAPE CARTRIDGE PLAYER

Filed Jan. 24, 1966 7 Sheets-Sheet 6

INVENTOR,
WILLIAM P. LEAR

BY Richard A. Marsen
his ATTORNEY

SELECTIVE-STEREO/MONAURAL TAPE CARTRIDGE PLAYER

Filed Jan. 24, 1966 7 Sheets-Sheet 7

INVENTOR,
WILLIAM P. LEAR
BY Richard A. Marsen
his ATTORNEY.

United States Patent Office 3,507,501

Patented Apr. 21, 1970

3,507,501
SELECTIVE-STEREO/MONAURAL TAPE CARTRIDGE PLAYER

William P. Lear, Wichita, Kans., assignor to Lear Jet Industries, Inc., Wichita, Kans., a corporation of Delaware Filed Jan. 24, 1966, Ser. No. 522,514
Int. Cl. G11b 5/02
U.S. Cl. 274—4 21 Claims

ABSTRACT OF THE DISCLOSURE

The player reproduces recordings of magnetic tape cartridges that have a plurality of successive parallel record tracks: in stereophonic or in monaural array. The stereophonic tracks are as parallel spaced pairs; the monaural, as successive single tracks. The transducer has two pick-ups arranged for the stereophonic recordings; either pick-up is selectively used for monaural play. The tape cartridge is physically coded per the record type therein, and actuates a sensing means that determines how the pick-ups are connected for play thereof. The transducer is stepped across the parallel tracks in succession, for continuous play. A cycling cam synchronizes therewith for selective connection of the pick-ups in accordance with the coded actuation per the record type in play. Automatic record-type play selection is thus provided for stereophonic or monaural tape records housed in individual cartridges, which may be directly inserted in the player.

This invention relates generally to magnetic tape players, and more particularly to novel players for selectively reproducing tape cartridges prerecorded with multiple stereophonic or monaural sound tracks respectively.

The present invention is particularly advantageous for magnetic tape cartridges having the tape in endless array; and is applicable to other tape carrier types as well. The invention will be set forth in connection with the cartridge tape players described in Patent Nos. 3,400,227 and 3,437,762, both assigned to the assignee hereof. Such players contain a magnetic head having two spaced pick-up sections that simultaneously coact with magnetic track pairs on the tape for stereophonic ("stereo") reproduction. The head is shifted transversely of the parallel track pairs in response to an end-of-track signal, or by manual override. By incorporating eight tracks on one-quarter inch wide tape one can readily provide 80 minutes of quality stereo music in a small flat hand-held cartridge: at 3.75 inches per second linear tape speed, with 20 playing minutes per track length. This involves a reel of tape about 400 feet long.

In accordance with the present invention, monaural ("mono") sound is recorded on the same type of tape for the same cartridge type and construction as for the stereo, and is played through the same player. The "mono" tracks are arranged in the same tracking locations on the tape as are the stereo ones, in a particular sequence for being consecutively played by the basic stereo head and shift mechanism of the invention system. The player hereof automatically reproduces the stereo or the monaural recordings made on the tape of the particular cartridge inserted therein. The only prerequisite is to somehow "inform" the player which recording mode is on the contained tape. One simple way is to code the cartridge case, as by the use of notch or hole in a particular region thereof for the monaural cartridges, and use a solid section thereat for stereo play, or vice versa. Such coding is used to shift a change-over switch to effect the proper mode of player operation, as will be set forth in detail hereinafter.

In the exemplary form of the invention, an auxiliary cam and switch combination is actuated by the track shifting mechanism to alternate connections to the respective head pick-up sections. The alternated connections are correlated with a switch and circuit that senses the type of cartridge in play: whether stereo or mono. For stereo the head picks-up the spaced track pairs, and reproduces them in two-individual channels for the right and left speakers. In the preferred monaural play, only one or the other head section is arranged to reproduce single tracks on the tape and feed both the left and right speakers simultaneously. In such manner the same order of sound level and sound output configuration is maintained for both modes.

The above and further objectives, features and advantages of the present invention will become more apparent from the following description of exemplary embodiments thereof, illustrated in the accompanying drawings, in which.

Figure 1:
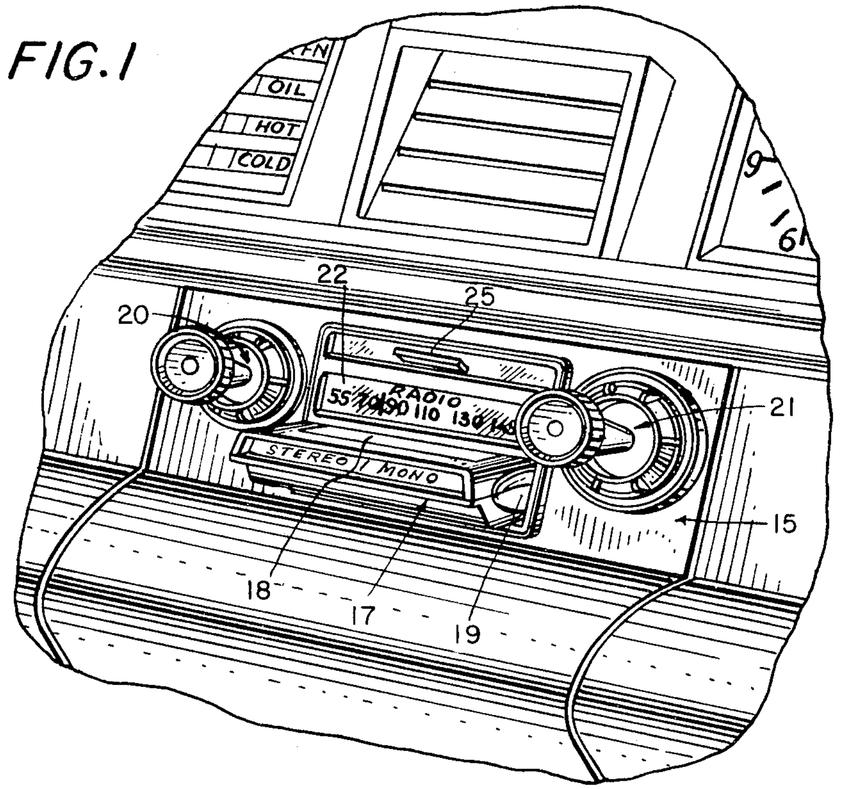
FIG. 1 is an illustration in perspective of the exemplary player, mounted in the dashboard of an automobile.
Figure 2:
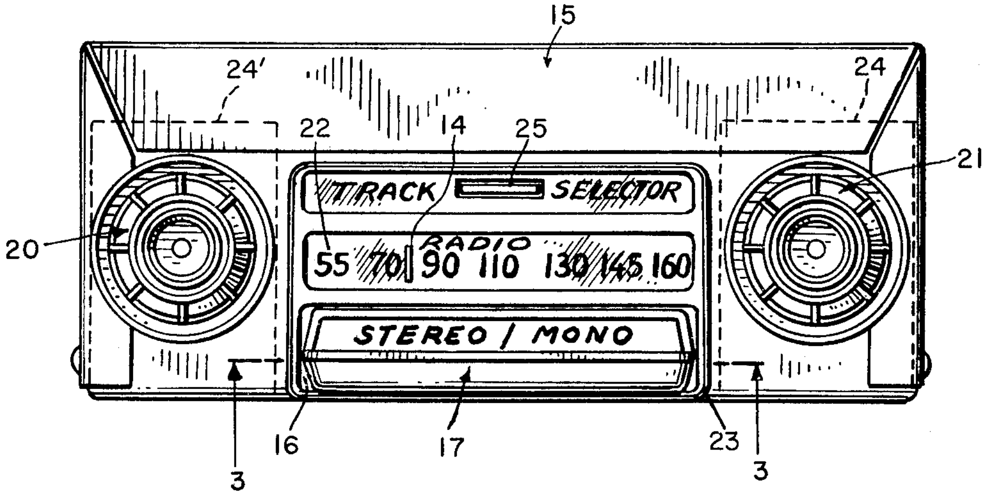
FIG. 2 is a front view of the magnetic tape player shown in FIG. 1 and incorporating the invention circuitry and mechanism.

While the exemplary magnetic tape player, externally shown in FIGS. 1 and 2, is of the cartridge type and constructed for automobile operation, it is to be understood that the present invention is more generally applicable, as hereinabove stated. The unit 15 is a combined radio-stereo player of compact array, that is readily fitted behind the automobile dashboard. The player 15 contains a slot or tunnel 16 into which an endless tape cartridge 17 is readily inserted for play through the front bezel 23.

The cartridge 17 has a top finger grip 18, and side ones 19 to facilitate its handling. It is shown fully inserted, in FIG. 1, for the tape play mode. The control knob sets 20, 21 are used to operate the radio and magnetic player, and for volume, tone and stereo balance settings. The radio tuner indicator 14 is moved along the radio dial 22. The player unit 15 is more fully described in the said copending patent applications, as is operation of the track selector switch 25. A radio tuner-detector module 24, indicated by dashed lines, is fitted along one side of the chassis unit 15; the stereo dual-channel amplifier 24', along the other side.

Figure 3:
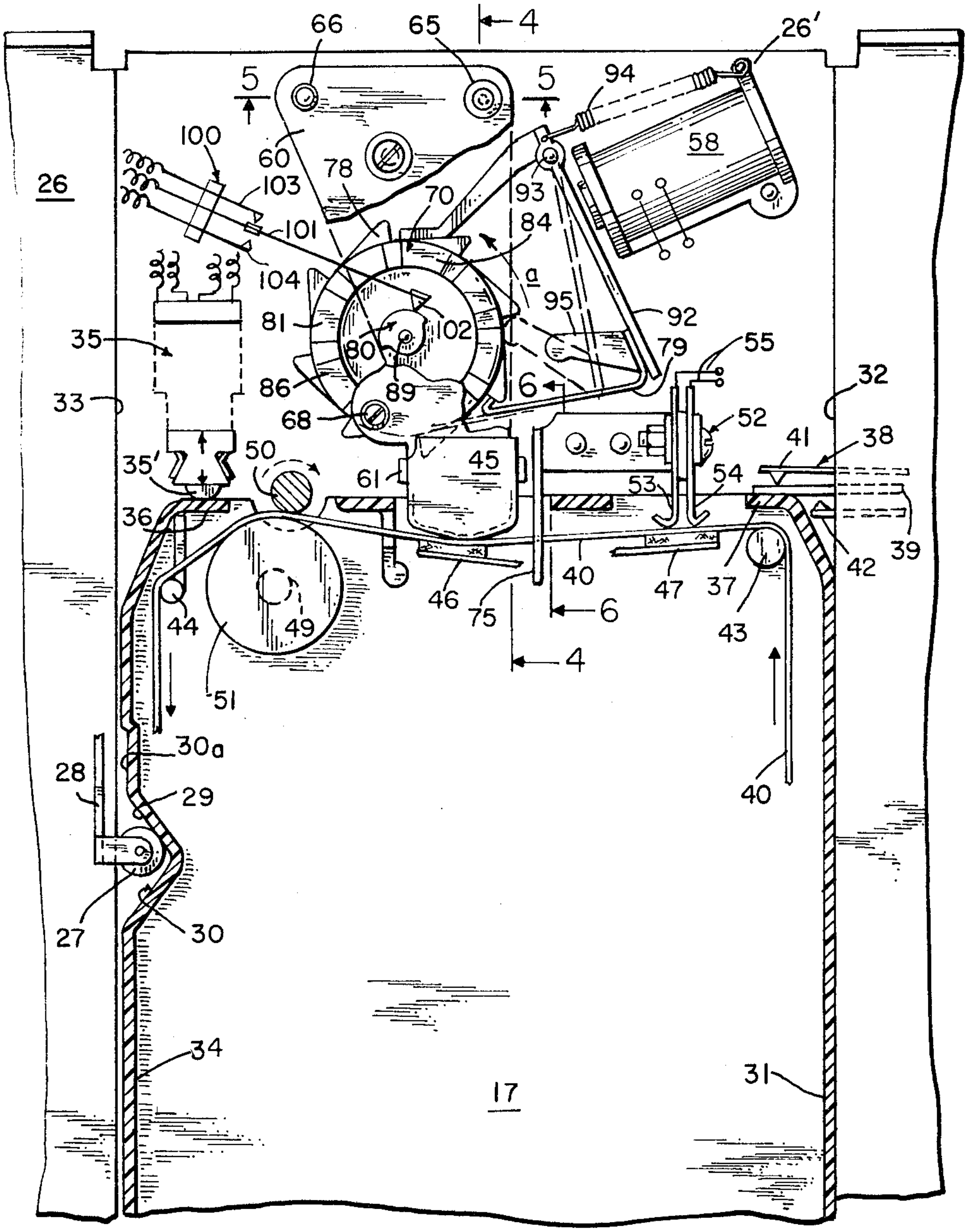
FIG. 3 is an enlarged plan view of the cartridge in relation to the stereo-mono track shifting mechanism, as seen from below, along the plane 3—3 as indicated in FIG. 2 in the direction of the arrows.

FIG. 3 is a view looking up from the bottom of the player chassis base 26, with the cartridge 17 inserted to the "play" position. A retention roller 27 on leaf spring 28 is pressed into a V-notch 30 on the side 34 of cartridge 17. The detent roller 27 presses the cartridge side 31 flush against the coacting chassis face 32 of the slot. The close fitting of chassis slot face 33 with cartridge side 34 serves to hold the cartridge in stable play position when retained by spring-pressed roller 27. The force action of detent roller 27 on the upper inclined surface 29 of V-notch 30 in the side 34 of cartridge 17 presses pinch roller 51 against drive capstan 50, with the tape 40 held operatively therebetween. The magnetic pick-up head 45 is positioned to enter an opening in the front of cartridge 17 to coact with the capstan-roller 50, 51 driven tape 40 held pressed thereagainst by spring-pressed pad 46. Pinch roller 51 is rotatably mounted on axial post 49 that is secured to the base of cartridge 17, or alternately on a spring post thereat normally biased outwardly towards the capstan 50. No forward fixed stop is requisite for thus positioning and holding the cartridge 17 in the tape play mode shown in FIG. 3.

Electrical switch 38 has an arm 39 that is actuated by the cartridge corner 37 when in the "play" position, as shown. When arm 39 is thus closed on contact 41, the motor control circuit is thereupon energized. The capstan 50 is rotated at a preset constant speed to transport or otherwise operate the magnetic tape 40 at its predetermined linear playing speed, as at 3.75 inches per second. Capstan 50 firmly presses tape 40 against pinch roller 51 in its drive relation. When the cartridge 17 is removed from the chassis 26 the switch arm 39 reconnects with lower contact 42. This in turn cuts off the player motor and connects the radio for play.

The magnetic tape is guided over corner posts or pins 43, 44, and is stabilized by felt pads 46, 47 lightly pressed to it. Pad 46 holds tape 40 against head 45; pad 47 presses it against contractor 52. Contractor 52 contains two feeler contacts 53, 54 that ride on the tape 40. The contacts are electrically separate and connect with leads 55. The electrical conductivity of the surface of tape 40 is too low to energize the track switching solenoid 58 across contacts 53, 54. As described in Patent No. 3,437,762 referred to hereinabove, a conductive patch secured to track end/start position on tape 40 (or other desired location) will short-circuit contacts 53, 54 and produce energization of solenoid 58 to shift head 45 to the next track (monaural) or set of tracks (stereo).

Figure 4:
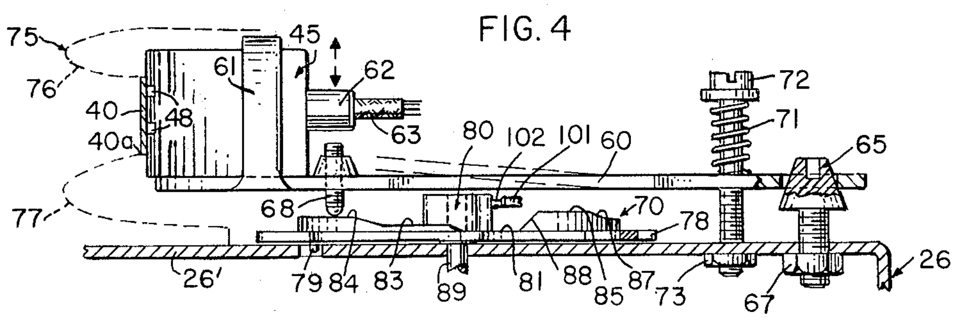
FIG. 4 is an elevational view of the shift mechanism, partly in section, as seen along the line 4—4 in FIG. 3, in the direction of the arrows.
Figure 6:
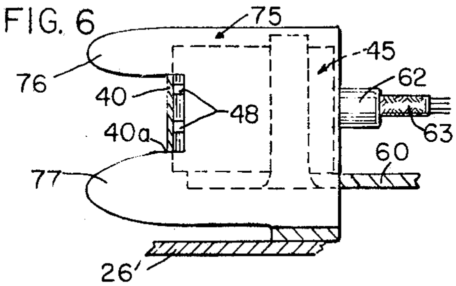
FIG. 6 is an elevational view of the tape guide member, as seen along the line 6—6 in FIG. 3.
Figure 5:
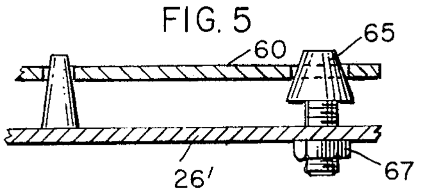
FIG. 5 is a sectional view through a portion of the shift mechanism, taken along the line 5—5 of FIG. 3.

It is noted that FIG. 3 is viewed upwardly from the bottom of the player, and FIGS. 4 to 6 are corresponding views that are upside-down from their normal position in the exemplary player 15. The head track shifting mechanism hereof is self-contained and not affected by gravity or bumps in the road while in a riding car. Accordingly, it is obvious that the disclosed orientation of the shift mechanism may be incorporated with the head 45, plate 60 and cam 70 oriented on the player base directly as is shown in FIG. 4 hereof. Spring 71 holds the assembly integrated under all operating conditions. Further, for the purposes of the present invention, other track shifting devices may instead be used.

Head 45 is firmly secured to support plate 60 by clip arms 61. An electrical plug 62 connects with prongs (not seen) of head 45 to conduct through cable 63 with the play amplifier. Head 45 is a dual unit with two predeterminedly spaced air gaps 48, 48 for pickup of paired stereo tracks on tape 40. The far edge of support 60 contains two apertures that respectively coact with conical posts 65, 66. Post 66 is secured to chassis base section 26'; post 65 being vertically adjustable through threads and nut 67 fixed to the chassis base 26'. A threaded pin 68 is held in a threaded aperture of plate 60. The rounded bottom end of pin 68 is arranged to ride on the stepped face cam 70. Pin 68 is preferably made of a tough material, as "Teflon," having low frictional action with metallic step cam 70. A spring 71 is held pressed against a central portion of plate 60, to maintain pin 68 and face cam 70 in operative relation. Spring 71 is supported by a bolt 72 held to chassis base 26' by a nut 73 secured to the base.

The reference position of the shift mechanism hereof is the preset distance that tape 40 is maintained from the chassis base 26' adjacent cam 70. Towards this end a tape guide 75 is supported adjacent head 45, as shown in FIGS. 3 and 4. Guide 75 consists of two fingers 76, 77 that project into an opening in the cartridge 17 and overlap the longitudinally moving tape 40. The finger 77 holds the adjacent edge 40*a* of tape 40 at the predetermined spacing from base 26', as the tape is simultaneously pressed against head 45 by pad 46. With tape 40 held in this steady fixed relation, the position of head 45 is initially factory or service adjusted, and in operation shifted by the invention system.

Precise position-adjustment of the head 45 with respect to the guide held tape 40 is accomplished through adjustable post 65 and pin 68. Conical post 65 is the "azimuth" adjustment member. The azimuth pivot axis of head support 60 passes through fixed conical post 66 and pin 68. Raising or lowering threaded post 65 causes a corresponding change in the angular setting of plate 60 and of head 45 with respect to the linear tracks on tape 40. Further, adjustment of cam follower pin 68 in plate 60 corrects for elevation of the head 45, and effects precise tracking position for the head. The elevation pivot axis is between end conical posts 65, 66. This presetting array is held steady and stabilized by spring 71.

The exemplary stepped face ram 70 is arranged to shift head 45 into four discrete track "heights" on tape 40. In practice, fewer or more successive steps may be provided, where desired or required. The stepped outer face of cam 70 is in an annular form as seen in FIG. 3, concentric to a central control cam 80. Further, cam 70 comprises two separate successive sets of four shift steps along its operative peripheral face as seen in FIG. 4 and "developed" FIG. 14. The flat steps 81, 81, lowest set in cam 70, position head 45 at the nearest track (set) on tape 40. This pin 68 assures this. When the ratchet rim 78 of cam 70 is gripped by spring-pawl 79 to advance one step, in the direction of dotted arrow *a*, pin 68 rides up the adjacent ramp 82 to the next spaced flat step 83. The third steps 84, 84 are reached through ramps 85, 85; the outer steps 86, 86 through ramps 87, 87 (see FIG. 14). The "return" inclines 88, 88 cause the stepping cycle to return to steps 81, 81.

The cam 70 is rotatably supported in base 26 by central post 89 secured to the center of the cam 70. Its action is "endless" so that upon completion of one step-set or cycle the stepping action and sequence is repeated. The cam shifting herein is accomplished each time solenoid 58 is "pulsed" or activated as aforesaid. When solenoid 58 is energized it attracts armature 92 that is pivoted at 93 against spring 94. As seen in FIG. 3, the spring-pawl 79, engaged with a ratchet tooth 78 rotates cam 70 to the next step position. Holding pawl 95 is moved against the ratchet 78 by spring 94 when the solenoid is normally unenergized, to its position shown in dotted lines, to stably hold the cam in its step positions. The direct shift of the pick-up head 45 with respect to the tape 40 is rapid, and is readily effectuated through a conductive strip or marker only one inch in length at the start/end recording region of the tape. The recorded tracks are all parallel. Hence a very small lateral shift of the head 45 suffices to effect its pick-up or coaction on the successive recorded (or recording) tracks on tape 40. As the step-cam 70 is arranged to recycle the head shifting, automatic restart of the playback (or recording) cycle is effectuated thereby. Means are herein provided for the track shift action hereof to be selectively responsive to the stereo or monaural recordings per se. or to distinctive cartridges therefor, and actuate the step-shift system accordingly.

The manual track selector 25, see FIG. 1, is connected to over-ride the automatic end-of-track shifting, resulting in a track shifting step by the cam 70 for each manual actuation of selector 25 in addition to those initiated by the start/end tape region. Rapid scanning and/or selection of recorded material across a two (or four) hour tape is readily performed through the manual selector. The direct precision action of the shift mechanism and system hereof has rendered practical the playback of ¼" tape with at least eight tracks—even in rugged mobile operation, for stereo and monaural recordings, selectively.

In accordance with the present invention the stereo-monaural record play selection is desirably performed automatically upon insertion of the cartridge 17 into the player 15. Towards this end a coded mechanical configuration is employed on the cartridge to selectively actuate switching means and circuitry in the player, as stated in the aforesaid Patent No. 3,437,762. Alternatively, the selection for the proper play mode may be performed by locating a suitable switch or the like on the front panel of the player for manual control, or by suitable electrical signals on the tape itself. In an exemplary form of the invention, a switch device 35 is fastened inside the player, adjacent the forward location of the cartridge 17 when inserted fully in the play mode, as shown in FIG. 3. Switch 35 has a frontal button 35'' that is displaced by the front corner 36 of cartridge 17.

Figure 12:
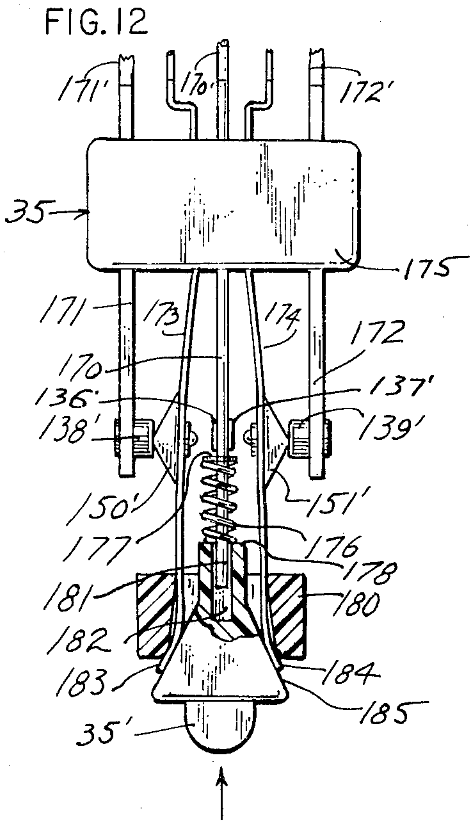
Figure 17:
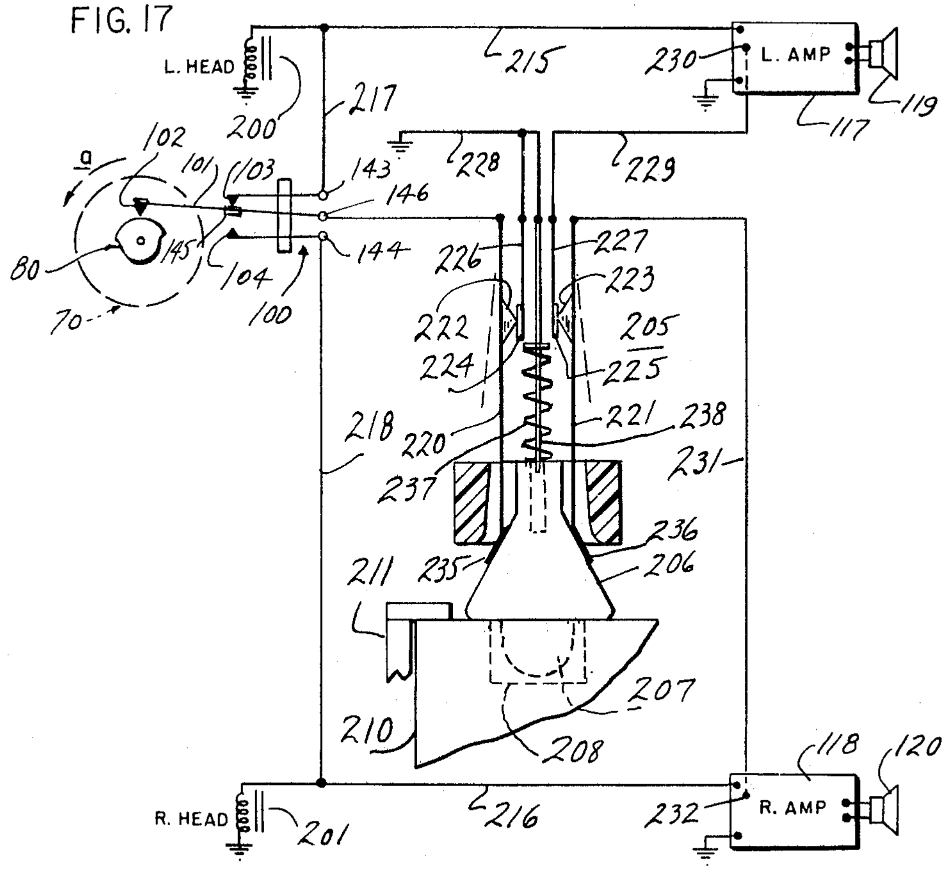
FIGS. 17 and 18 are circuit diagrams of modified stereo-mono circuits and mechanism.

The switch button 35' is spring-biased towards the cartridge corner 36, and is moved inwardly of the switch body 35 when the cartridge 17 is positioned as shown in FIG. 3; and is held in such state by the abutting corner corner 36. This corresponds to the actuated mode for the switch 35, as illustrated in FIG. 12, and its corresponding circuit as in FIG. 9, for stereo play herein. In the exemplary system, a portion of the corner 36 is cut away for cartridges containing monaural recordings, see FIG. 10. Switch 35 thereupon remains unactuated upon full cartridge insertion; button 35' entering an open region of the cartridge as indicated in FIG. 17. The corresponding circuit mode is per FIG. 8 for monaural play. Other mechanical code arrangements and corresponding switching means, may be used for the selection function to properly play for the contained stereo or mono records. Such an alternative is described hereinafter in connection with FIG. 10A. Also, other switch embodiments and circuit arrangements may be used in practising the principles and novel advantages of the invention hereof.

Another important feature of the present invention is the synchronism provided for automatic electrical selection of the stereo or monaural record tracks in proper sequence, in synchronism with the transverse stepping operation of the pick-head 45. A cam switch 100 has an extended lever or arm 101 with an insulated tip 102 in coaction with the cam 80 central on stepping ratchet-cam 70. Cam 80 is a two-position radial type, moving switch arm 101 outwardly to electrically connect with upper contact 103 of switch 100 as shown in FIG. 3, or to the normally closed lower contact 104. The mechanical orientation or phasing of cams 70 and 80 is significant, and is set forth in detail hereinafter, particularly in connection with FIGS. 14 and 15.

Figure 7:
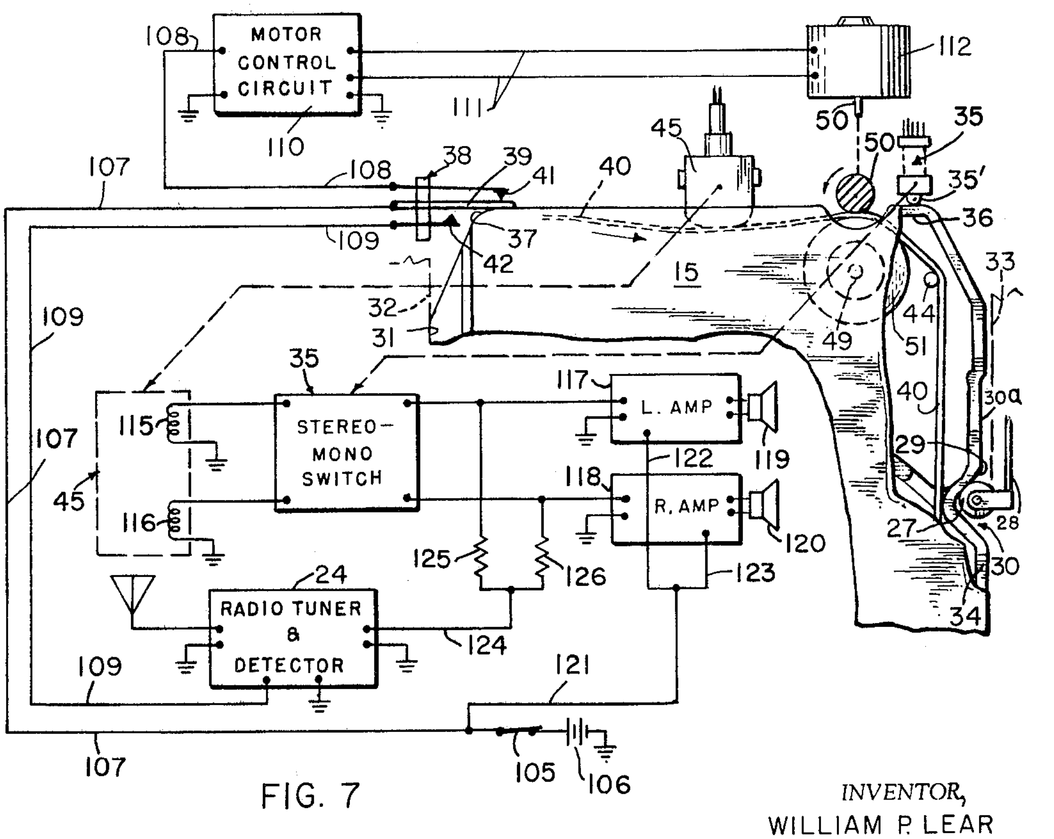
FIG. 7 is a schematic overall circuit diagram of the radio-cartridge player hereof.

FIG. 7 is a schematic circuit diagram of the overall exemplary system hereof comprising the tape-record player combined with a radio-receiver. The cartridge 15 is inserted through the slot 16 at the front panel and between side guides 32, 33. When fully inserted its pinch roller 51 is pressed against the capstan 50, and held in proper pressure relation by side-detented roller 27 with the record-tape 40 therebetween. The central region of the forward inclined upper notch surface 29 has a forward force component exerted thereon by the roller detent 27 to maintain the rubber-tired pinch roller in operational drive relation with the tape 40 and the capstan 50. A mechanically stable cartridge hold in this play mode is effected. No frontal stop unit is required to set the inward position of a cartridge with a solid pinch roller mount 49 as shown.

In the illustrated tape-play position of the cartridge 15 the dual-gap head 45 is partially therewithin in signal pick-up engagement with the multi-track magnetic tape 40; the electrical mode-of-operation switch 38 is actuated to the tape-play mode of cartridge tip 37 pressing contact arm 39 against contact 41; and the chassis supported stereo-mono switch 35 is pressed-in by cartridge tip 36 moved against its button 35'. With the main or master on-off switch 105 closed on battery 106, connections 107 and 108 are completed through contacts 39, 41 of switch 38 to the motor control circuit 110. Circuit 110 is thereupon directly activated to energize drive motor 112 through leads 111. Motor 112 is preferably a direct non-geared drive, rotating its output shaft 50 at the predetermined speed to serve as the capstan for the tape. By providing sufficient rotational inertia to the rotative motor portion, no belt-flywheel stabilization is required. A suitable direct current motor 112 is set forth in Patent No. 3,364,369 that issued on Jan. 16, 1968, and is assigned to the same assignee. A suitable motor speed control system 110 therefor is the basis of Patent No. 3,396,323 that issued on Aug. 6, 1968, assigned likewise.

The signal pick-up head 45 contains the two predeterminedly spaced magnetic air-gaps 48, 48 referred to hereinabove, each having an associated transducer coil 115, 116. The coils 115, 116 are separately connected to the stereo-mono switch means 35 indicated in block form, and detailed and described more fully hereinafter. The output of switch means 35 connects to individual amplifiers 117, 118 of the respective left and right channels (for stereophonic use), and on to speakers 119, 120. The amplifiers remain energized and operative while main on-off switch 105 is closed. A direct connection 121 from battery 106 and switch 105 extends to each amplifier through leads 122, 123.

Thus, when the cartridge actuates switch 38 to the tape play mode, the motor 112 drives tape 40 across head 45, and pick-up coils 115, 116 translate the recorded signals to amplifiers 117, 118 and in turn to speakers 119, 120. When the cartridge is withdrawn, fully or partially sufficient to release switch arm 39, switch 38 returns to its normal condition: connecting contacts 39 and 42, and leaving contact 41 open. The motor circuit is thereupon de-energized, and the tape 40 stationary within the withdrawn cartridge. The closure of switch contacts 39, 42 completes battery input to the radio tuner and detector unit 24 through leads 107 and 109. The audio signal output from radio unit 24 is thereupon impressed upon both audio amplifiers 117, 118 through coupling resistors 125, 126 from radio output lead 124. The resistance values of 125, 126 are each preferably substantially larger than the impedance of the respective pick-up coils 115, 116. Thus the presence of the radio output connections in the amplifier input circuits is of negligible effect during tape-record play through the much lower impedance coils 115, 116; and conversely.

It is to be understood that the radio/player and amplifier circuits hereof are usable also where no stereo-monaural switching means (35, 100) are provided, as for example in said Ser. No. 292,212 patent application. In the latter arrangement, the switch 35 of FIG. 7 is by-passed, with coils 115, 116 connected directly to the respective resistors 125, 126 and the amplifiers 117, 118. In such radio/player systems the exemplary pick-up coils 115, 116 have about 1000 ohm impedance at 1000 cycles, and the radio output coupling resistors 125, 126 each are the order of 150,000 to 200,000 ohms. It is evident that no signals are generated in coils 115, 116 during the radio-play mode; and that no radio signals are provided during the tape-play mode. An auxiliary notch 30*a* is positioned forward of V-notch 30 to coact with detent roller 27 to stably hold the cartridge in partially withdrawn condition in the player.

Figure 8:
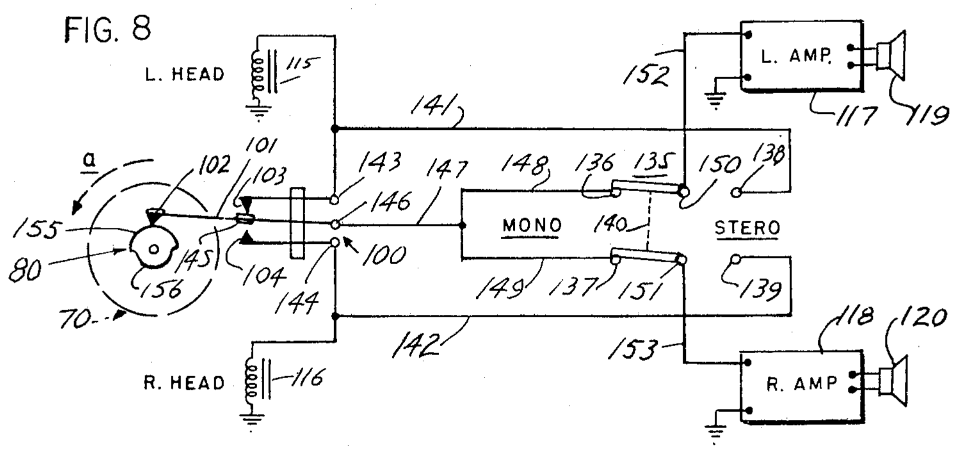
FIG. 8 is a circuit diagram of the tape player in the monaural play mode.
Figure 9:
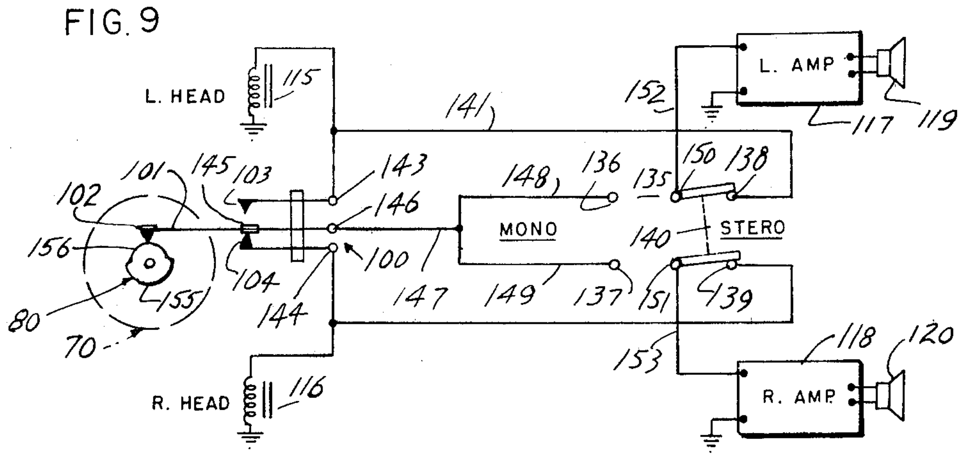
FIG. 9 is a schematic diagram of the tape player in the stereo play mode.
Figure 10:
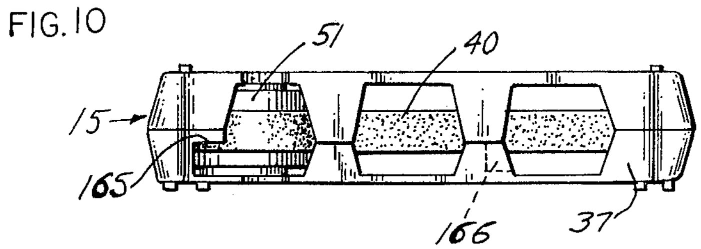
FIG. 10 is the front end view of the exemplary tape cartridge coded for monaural play.

FIGS. 8 and 9 are illustrative of the operation of the stereo-monaural system hereof. Select switch 135 is a double-pole double-thrown type connected for monaural-play to contacts 136, 137 (FIG. 8); and for stereophonic-play, to opposite contacts 138, 139 (FIG. 9). Replacing switch 135, which is manually operable, by a switch type per 35 (FIGS. 3 and 7) operated by cartridge insertion, renders the stereo-mono function automatic, being responsive to suitable coding of the respective tape-record cartridges. Coil 115 is connected to contact 138 by lead 141; coil 116 to contact 139 by lead 142. Coil 115 also is connected to terminal 143 for cam switch contact 103; coil 116 to terminal 144 for contact 104. Central contact 145 has its terminal 146 connected to the "mono" contacts 136, 137 by leads 147, 148, 149.

The terminals 150, 151 of the arms 140 of selector switch 135 are respectively connected to the inputs of the left and right amplifiers 117, 118 by leads 152, 153. The central two-position cam 80 moves cam follower 102 radially outwards when its 180° section 155 coacts therewith as shown in its FIG. 8 position. The cam section 155 extends in phase with one full set or cycle of stereo-play transverse track shifting steps (four steps in the exemplary system with eight recorded tracks on one-quarter inch wide magnetic tape). The phase referred to is related to the synchronous functioning of cam-switch 100 for the stereo-mono selective operation to be set forth in detail, in relation to the shifted head 45 and its pair of pick-ups 48, 48 transversely across the tape 40 as effected by step cam 70. Such phase relationship is described further in connection with FIGS. 14, 15, and 16. The second 180° cam section 156 permits arm 101 to move inwardly radially, as shown in FIG. 9, with common contact 145 remaining in connection with contact 104 during the following cycle of (four) transverse head shifting steps.

The circuit action of FIGS. 8 and 9 is as follows: In the mono-mode connection of switch 135, in FIG. 8, pick-up head 115 is directly connected to its corresponding amplifier 117 across cam-switch contacts 103, 145 and select switch contacts 136, 150. The opposite pick-up coil 116 remains unconnected while cam section 155 is operative on arm 101 and follower 102. The record-track which the left head section 115 is scanning or transducing is reproduced through left amplifier 117, and simultaneously also through right amplifier 118. The inputs of amplifiers 117, 118 are interconnected in the mono-play mode by leads 148, 149. In this manner the overall sound output level of speakers 119, 120 remains substantially the same as previously set for a stereo-play record; and both speakers maintain the same acoustic output configuration for listeners. This is greatly advantageous over only a single channel and speaker set operative for monaural record play in the system that alternatively plays stereo records, as herein.

When the successive camming cycle per cam 80 occurs, its section 156 permits or causes the closure of cam switch contacts 104, 145. In this mono mode the left pick-up coil 115 remains unconnected while the right coil 116 is played through both amplifiers, as for the coil 115 in the cycle for section 155. Such cyclic sequencing, phasing and coordination results in the accurate, proper and complete reproduction and playing of the successive parallel monaural tracks as recorded on the tape 40. With the select switch 135 in the stereo position, per FIG. 9, the terminals of cam-switch 100 remain unconnected to switch arms 40 of select-switch 135, and the two pick-up coils 115, 116 are directly connected to their respective amplifier channels 117, 118 for the normal stereophonic reproduction and play.

For automatic triggering or otherwise setting of the system hereof in the correct circuital mode for playing the tape-record contained in cartridge 17 that is inserted in the player 15, its forward end is mechanically coded in the exemplary form of the invention. The otherwise solid front cartridge portion 36 shown in FIG. 3 that is used for contained stereo tape-records, is cut-away as at 165 in FIG. 10 when used for contained monaural tape records. The cut-away 165 permits the selector switch 35 of FIGS. 3 and 7 to remain unactivated, in the manner indicated in FIG. 17, illustrated in FIG. 11, and electrically connected per switch 135 of FIG. 8 for the monaural-play mode. For the single selector switch 35 form of the invention, the single cut-out 165 may be at a different location of the cartridge, as at 166, with the switch being mounted in the chassis for coaction with that location.

Figure 10A:
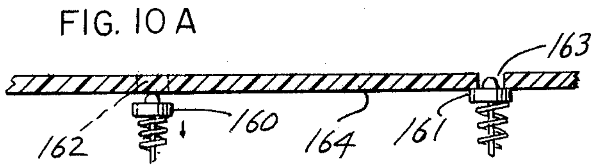
FIG. 10A, a modified form thereof.

Automatic stereo-monaural selection also may be performed with two switches 160, 161, as illustrated in FIG. 10A. For example, switches 160, 161 each may be single-pole double-throw, suitably interconnected in the manner of the circuits of FIGS. 8 and 9. For this purpose two locations 162 and 163 are selected on the cartridge 164 for cut-outs to selectively operate switches 160, 161. With location 162 kept solid, and location 163 cut-out, as shown, we have the stereo-play mode: with switch 160 thereupon actuated; and switch 161, unactuated. For the monaural mode, the reverse is used: location 162 is cut-out; location 163 remains solid. Other coded arrangements and/or switch types may be used therefor, as will be understood by those skilled in the art.

Figure 11:
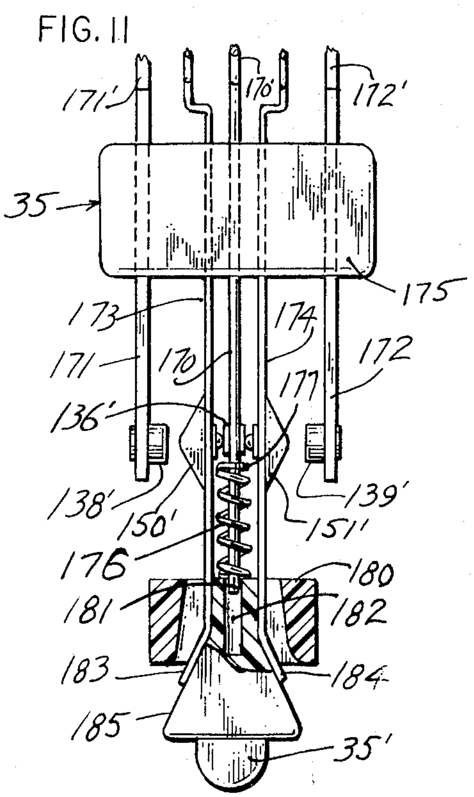
FIGS. 11 and 12 are enlarged plan views of one form of the stereo-mono switch hereof, in their respective mono and stereo positions.

The exemplary switch 35 is shown in enlarged view: In FIG. 11 in its unactuated state; in FIG. 12, actuated with its push-button 35' pressed-in as indicated by the arrow. Switch 35 is composed of a central metallic rod containing the interconnected monaural play contacts 136', 137' corresponding to contacts 136, 137 of FIGS. 8 and 9. Rod 170 extends through phenolic switch block 175 as terminal 170'. The outer contacts 138', 139' are the stereo-mode contacts corresponding to contacts 138, 139 and are electrically part of metallic arms 171, 172 with terminals 171', 172'. The flexible spring arms 173, 174 contain dual contacts 150', 151'. A helical spring 176 is concentric about the end portion of the rod 170 and extends between a stop 177 thereon and the back 178 of displaceable button 35'.

In its unactuated extended condition the back-contacts of 150', 151' are in connection with central contacts 136', 137' for the mono-play mode, as shown in FIG. 11. When button 35' is pressed inwardly of switch 35 as shown in FIG. 12 it is moved along the tip 181 of rod 170, with a concentric cavity 182 therein. The inclined surfaces 185, 185 of button 35' spread apart the contiguous tips 183, 184 of blades 173, 174, as shown in FIG. 12. A collar 180 limits the movement of button 35' and the blade tips 183, 184. The outer portions of contacts 150', 151 thereupon connect with contacts 138', 139' for the stereo-play mode per FIG. 9.

Figure 13:
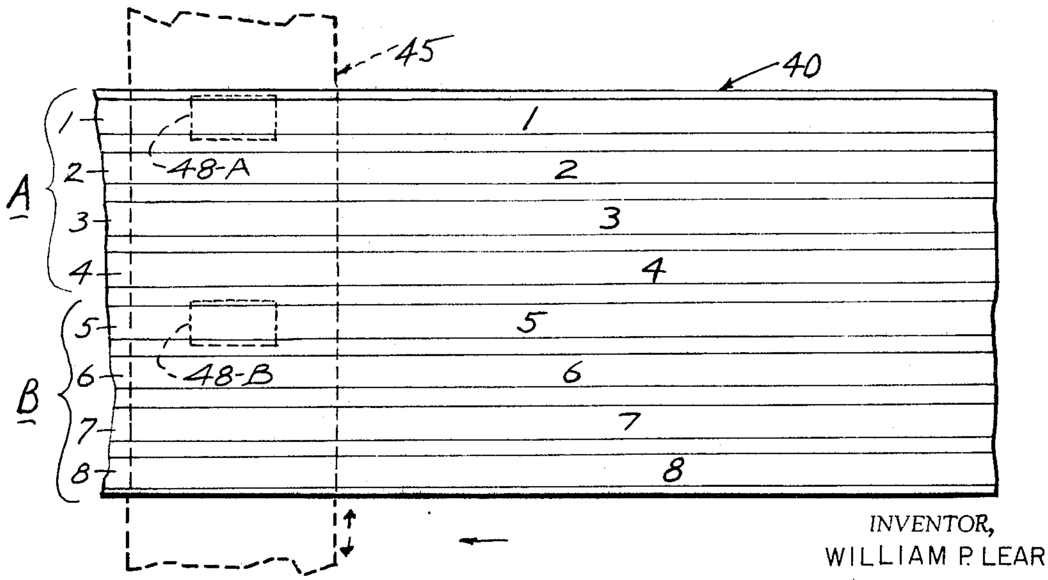
FIG. 13 is a very enlarged diagrammatic illustration of the eight track tape, and its relation to the pick-up head.

FIG. 13 is an enlarged schematic representation of magnetic tape 40 with eight parallel spaced recorded tracks thereon identified as 1, 2, . . . 8 and the dual pick-up head 45 containing the two properly spaced air-gap coil sections 48–A and 48–B. The head 45 is closely adjusted and oriented as aforesaid so that pick-up regions 48–A, 48–B are "on-track" with the presented recorded regions 1 to 8 as tape 40 is transported laterally past head 45. Pick-ups 48–A and 48–B are herein spaced apart by the distance between associated track pairs of stereo recordings so as to simultaneously reproduce tracks 1 and 5 (as in FIG. 13), 2 and 6, 3 and 7, or 4 and 8. Head 45 is shifted transversely of the tracks 1 to 8 either in response to end-of-track signals or by manual control as in manner set forth hereinabove. The head-track shift sequence is 1 and 5, 2 and 6, 3 and 7, 4 and 8, and then recycles to 1 and 5, etc. Stereo recordings are impressed in sequence on such successive track pairs, each track-pair having two respective stereophonic channels.

The monaural recordings herein are arranged sequentially on single tracks 1 through 8. Were only one pick-up as either 48–A or 48–B used in a player system for the mono playback it would require an eight-step traverse on each play cycle. The present invention importantly provides for the proper monaural playback of such mono tape-record utilizing the same head traversing mechanism (68, 70) and dual head (45) used to reproduce the stereo tape-records. Two successive four-step head traversing cycles are indicated as A and B in FIG. 13. Thus for stereo playback, the A cycle picks up on tracks 1 and 5, 2 and 6, 3 and 7 and then 4 and 8; and the B cycle repeats it as do the successive ones. In monaural playback, during the A cycle pick-up section 48–A is used and transcribes the tracks 1, 2, 3 and 4 in succession, while the other section 48–B is left open, grounded or otherwise remains unused. During the next head shift cycle B, pick-up 48–A is left unused while section 48–B is connected to reproduce in succession tracks 5, 6, 7 and 8. Further cycles simply repeat those described for A and B. Also, where a tape-record is inserted in the player when the head 45 is in an intermediate position in its cycling, the transcription starts thereat and continues on as set forth herein. The same principles hereof are applicable to tapes of different widths and/or number of recorded tracks thereon; and also for tape recorders as well as players.

Figure 14:
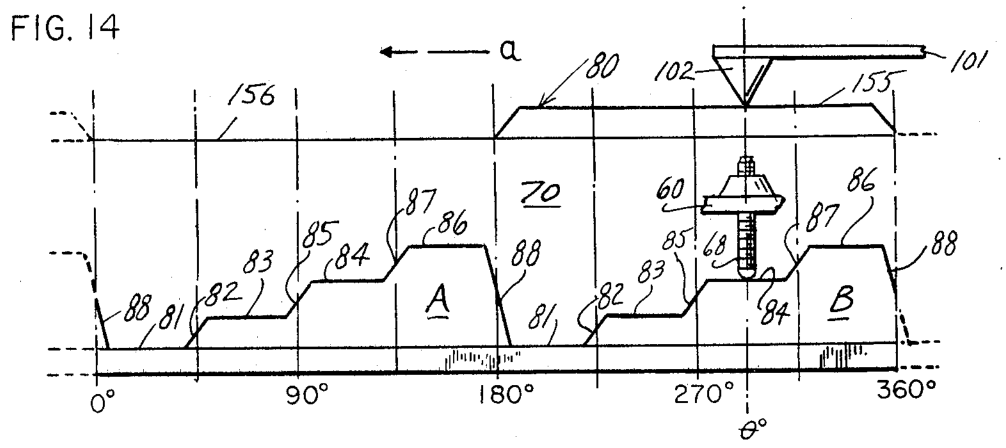
FIGS. 14 and 15 are developed illustrations of the operation of the stereo-mono switch camming in relation to the tape track shifting.

FIG. 14 is graphically illustrative of the phasing and synchronization principles of the stereo-mono cam-switching hereof in relation to the head track-shifting operation. The two four-step cycles A and B correspond to the shape of the annular face cam 70. The cam follower 68 is on the third step of cycle B, corresponding to the angular position $\theta°$ of cam 70, and as shown in FIGS. 3 and 4. The switch-cam 80 has two 180° sections 155, 156 each extending over one complete step-cycle A and B, and in operative phase therewith. Thus, although the diagram, FIG. 14, shows cam section 155 extending from 180° to 360°, over step-cam B, in practice section 155 is physically shifted angularly on cam 70 in correspondence with the physical orientation of cam follower 102 in the player. This factor is clear from the plan view thereof in FIG. 3.

Figure 15:
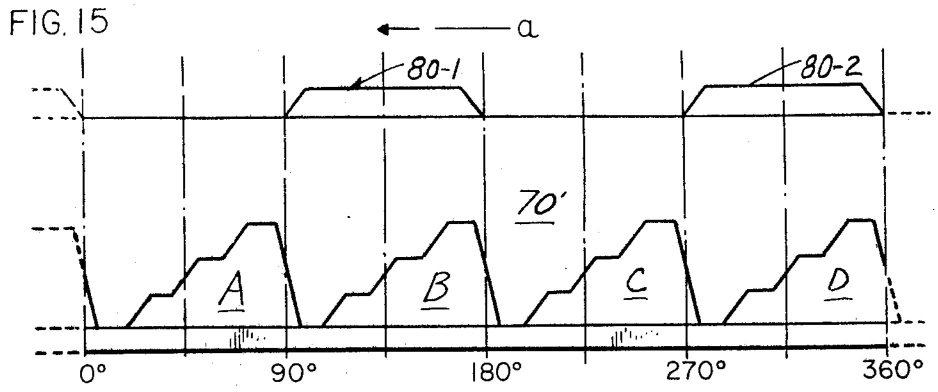
Figure 16:
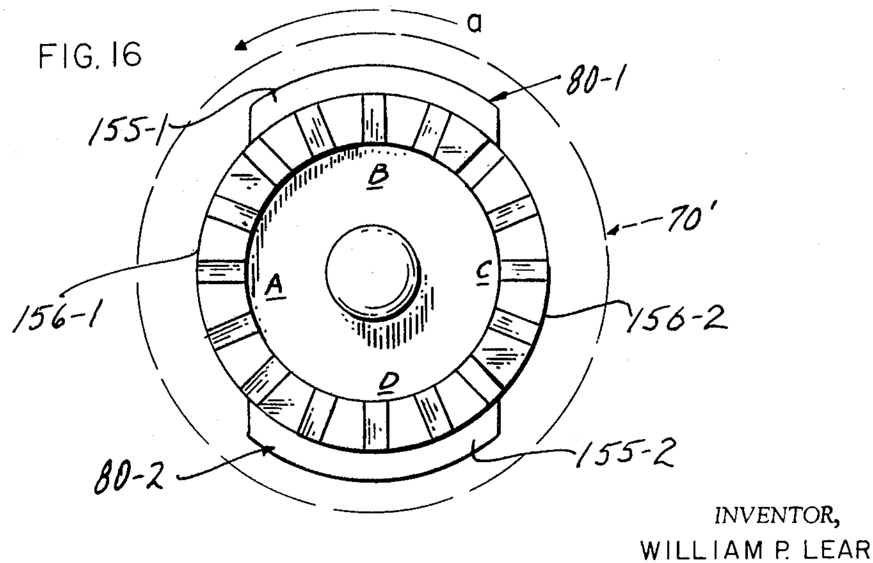
FIG. 16 is a plan view of a modified, combined switching and shifting cam.

A further significant feature of the present invention is the use of an even number of complete head stepping cycles, as A and B, in the system. In this manner the cam-switching and synchronization means are made simpler and more foolproof. FIGS. 15 and 16 are illustrative of such composite arrangement 70′ with four four-step shift cam-sections: A, B, C, D, with two switch-cams 80–1 and 80–2. The radially projecting portion 155–1 of cam 80–1 coincides with step-cam B; and 155–2 of cam 80–2, with step-cam D each for 90° about the composite cam 70′. The successive stereophonic track-pair reproduction of tape 40 as well as for the successive monaural mode proceeds as for cam 70 detailed hereinabove, with cyclic repetition.

FIG. 17 is a modified circuit arrangement of the present invention. The left pick-up coil 200 connects to the input of left channel amplifier 117 through lead 215; right coil 201, to right channel 118 through lead 216. A double-pole single-throw switch 205 is similar to switch 35 with an inclined surface 206 on its push-button 207. Button tip 207 is either pushed inwardly by a solid cartridge front portion, or left un-actuated as shown by fitting in a cut-out opening 208 in cartridge 210. The cartridge 210 may abut a safety stop 211 (or its capstan) for this "mono" mode, as illustrated. Pick-up coil 200 is connected to terminal 143 of switch 100; coil 201 to terminal 144 by lead 218. Common terminal 146 connects to blade 220. Its contact 222 is normally closed on contact 224 of blade 226 which is grounded through lead 228. In this manner, in the "mono" mode, closure of common contact 145 on either contact 103 or 104 of switch 100 through the action of cam 80, grounds-out signals picked-up by coils 201 and 200 respectively through blade contacts 222, 224. The ungrounded coil feeds its associated amplifier in the normal manner. Coincidentally the amplifiers 117, 118 are suitably intercoupled for simultaneous amplification of the same impressed signal. This is accomplished through the closure of contact 223 of blade 221 on contact 225 of blade 227. Blade 227 connects through lead 229 to a suitable interstage point of the amplifier 117 circuit indicated at 230; blade 221 to a corresponding point 232 of amplifier 118 by lead 231. The ungrounded pick-up coil 200 or 201 thus plays directly through its amplifier, with the shorted-out coil transmitting no signal. The amplifier with shorted input is coupled through closed contacts 223, 225 to the other one across leads 229, 231 to points 230, 232. The amplifiers 117, 118 thus both play in common for the monaural mode. A coupling condenser may be used in the connections of leads 229, 231 to the amplifiers.

In the stereophonic mode button 207 is pressed-in, with inclined sides 206 spreading blades 220, 221 apart at its coacting tips 235, 236. The button 207 presses against a helical bias spring 237 about central rod 238. Rod 238 is grounded by lead 228 and serves to shield the two channel stereo signals in switch 205. In the stereo mode, the four contacts of switch 205 remain open and unconnected. The two coils 200, 201 are thereupon directly connected to their respective amplifiers 117, 118 in normal stereophonic track-pairs. Switch 205 is simpler than switch 35, and the direct coupling of heads 200, 201 avoids contacts in their low level circuitry that are potentially noisy due to dust accumulation.

Figure 18:
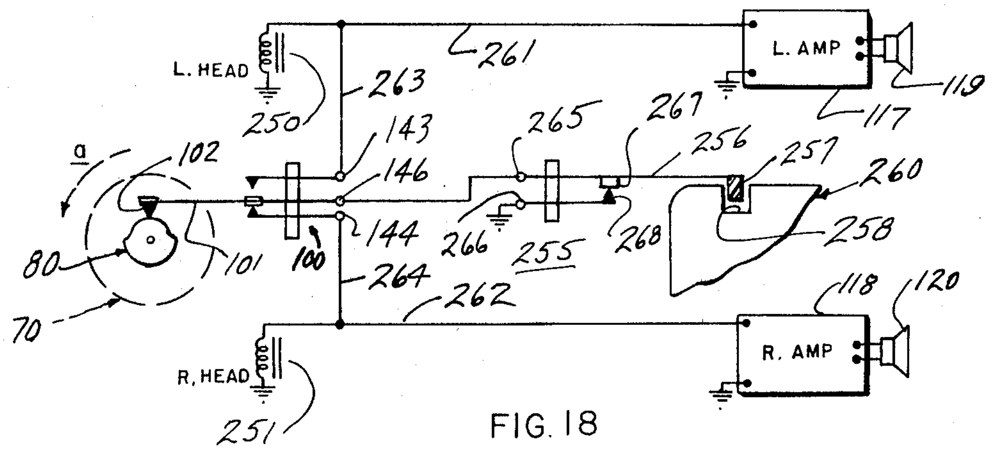

FIG. 18 is a further stereo-mono modification, still simpler to effect, but with the limitation of one amplifier-speaker being played alternately for monaural playback, instead of both together as in the other forms set forth hereinabove. Pick-up coils 250, 251 connect directly to their respective amplifiers 117, 118 by leads 261, 262. The cartridge operated stereo-mono mode switch 255 is a single-pole single-throw type with an extended arm 256 having a tip 257. Tip 257 is either displaced by the cartridge 260 for the stereo-mode or enters a cut-out 258 thereof, as shown, for the mono-mode.

The left head coil 250 connects to terminal 143 of sequencing switch 100 by lead 263; right coil 251, to terminal 144 by lead 264. Terminal 265 of switch 255 connects to common terminal 146 of switch 100; terminal 266 to ground. With sensor switch 255 unactuated by the cartridge, its contacts 267, 268 remain closed. In this mode, coils 250, 251 are alternately grounded through the closed switch 255 and operation of sequencing switch 100. This results in corresponding play of the amplifier channels 117, 118, for the corresponding ungrounded pick-up coil. With a stereo-record cartridge (260) tip 257 is raised to unconnect contacts 267, 268. The grounding action by switch 255 is omitted and the two coils 263, 264 play normally in stereophonic reproduction.

Although the present invention has been set forth in connection with exemplary embodiments, it is to be understood that its features and principles may take other forms, and modifications may be made therein that fall within the broader spirit and scope of the invention.

What is claimed is:

1. A player for selectively reproducing a record arranged as parallel magnetic tracks along a magnetic tape assembled for insertion in the player, comprising a transducer with two predeterminedly spaced pick-ups arranged for physical coaction with successive correspondingly spaced track pairs of stereophonic magnetic recording on the tape, amplifier means for individual coupling with said pick-ups for reproduction of corresponding stereophonic track pairs when so recorded on the tape, means responsive to the track ends for stepping said transducer transversely with respect to said tape onto successive track pairs for continuous play of the tape record while it is transported longitudinally across the pick-ups, and means responsive to the insertion of an assembled monaural record tape in the player for selectively connecting said pick-ups individually for reproduction of individual record tracks in proper monaural succession on the tape in accordance with their predetermined monaural array thereon.

2. A player as claimed in claim 1, in which the tape record is contained in a cartridge and the selective connection means includes means coactable with said cartridge for sensing the type of tracks recorded on the tape.

3. A player as claimed in claim 2, in which the sensing means comprises switching means in circuit with said pick-ups for selective switchover thereof to corresponding continuous stereophonic or monaural play of the record tracks in succession.

4. A player as claimed in claim 3, further including cyclic means responsive to the operation of the stepping means and in circuit with said switching means for synchronizing the connection of said pick-ups in individual relation with said selective connection means in accordance with the monaural track sequence on the tape record.

5. A player as claimed in claim 4, in which said cyclic means is in predetermined phase relationship with said stepping means and comprising a cycling switch actuated by said cyclic means and in circuit relation between said pick-ups and said switching means.

6. A player as claimed in claim 5, in which said cyclic means effects the said switchover of said switching means to individually connect the pick-ups in play operation successively upon the completion of each cycle corresponding to the play of a standard stereophonic record by the player.

7. A player as claimed in claim 3, in which the cartridge has physical coded means thereon for actuation of the switching means in correspondence with the record type on the tape therein.

8. A player as claimed in claim 7, in which said coded means is arranged to actuate said sensing means into its operational mode for the selective playing of the contained tape-record.

9. A player as claimed in claim 2, further including cyclic means responsive to the operation of the stepping means for synchronizing the connection of said pick-ups in individual relation in accordance with the monaural track sequence on the tape record.

10. A player as claimed in claim 9, in which said cyclic means is in predetermined phase relationship with said stepping means.

11. A player as claimed in claim 9, in which said cyclic means effects the said switchover of said switching means to individually connect the pick-ups in play operation successively upon the completion of each cycle corresponding to the play of a standard stereophonic record by the player.

12. A player as claimed in claim 9, in which said cyclic means includes a stepping cam containing an even number of cycles for stepping said transducer in its normal translation of the stereophonic track pairs of the tape record.

13. A player as claimed in claim 12, further including a cyclic cam for said cyclic means coupled to said stepping cam in predetermined physical orientation therewith.

14. A player as claimed in claim 1, in which the selective connection means is responsive to the record type on the assembled tape and includes switching means in circuit with said pick-ups for selective switchover thereof to corresponding continuous stereophonic or monaural play of the record tracks in succession.

15. A player as claimed in claim 14, further including cyclic means responsive to the operation of the stepping means and in circuit with said switching means for synchronizing the connection of said pick-ups in individual relation with said selective connection means cyclically in accordance with the monaural track sequence on the tape record.

16. A player as claimed in claim 15, in which said cyclic means is in predetermined phase relationship with said stepping means and comprising a cycling switch actuated by said cyclic means and in circuit relation between said pick-ups and said switching means.

17. A player as claimed in claim 15, in which said cyclic means effects the said switchover of said switching means to individually connect the pick-ups in play operation successively upon the completion of each cycle corresponding to the play of a standard stereophonic record by the player.

18. A player as claimed in claim 15, in which said cyclic means includes a stepping cam containing an even number of cycles of stepping said transducer in its normal translation of the stereophonic track pairs of the tape record.

19. A player as claimed in claim 18, further including a cyclic cam for said cyclic means coupled to said stepping cam in predetermined physical orientation therewith.

20. A player as claimed in claim 14, in which the magnetic tape is contained in a cartridge having physical coded means thereon for actuation of the selective connection means in correspondence with the record type on the tape therein.

21. A player as claimed in claim 20, in which said coded means is arranged to operate the switching means into its proper mode for the selective playing of the contained tape-record.

References Cited

UNITED STATES PATENTS

| | | | |
|---|---|---|---|
| 2,821,576 | 1/1958 | Gaubert | 179—100.2 |
| 3,037,093 | 5/1962 | Nowlan | 179—100.2 |
| 3,350,025 | 10/1967 | Lear | 179—100.2 |

BERNARD KONICK, Primary Examiner

J. R. GOUDEAU, Assistant Examiner

U.S. Cl. X.R.

179—100.2